O. HARNED.
VENTILATOR.
No. 183,848.  Patented Oct. 31, 1876.
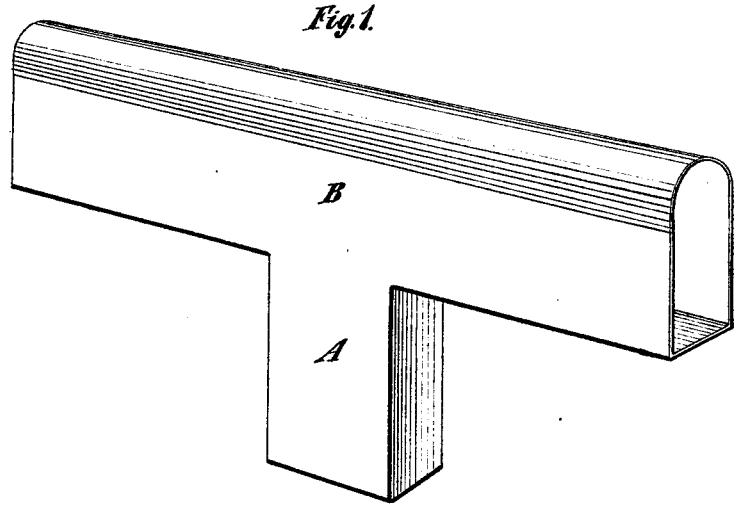
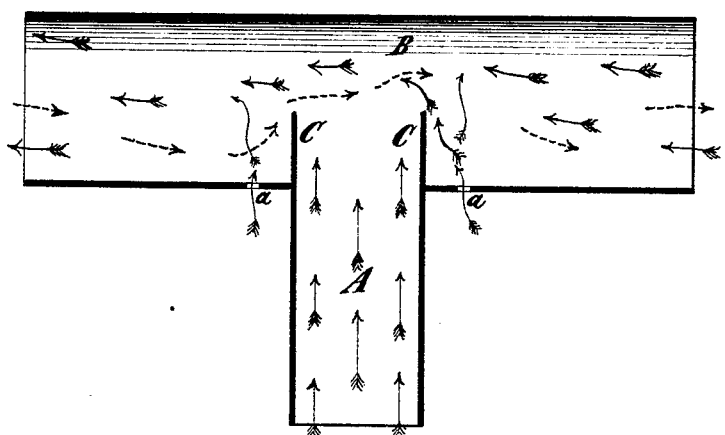
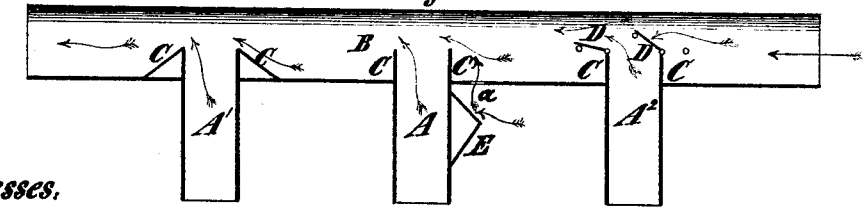
Witnesses:
Thomas E. Birch.
H. A. Chapin
O. Harned
by his attorneys
Van der Veer & Brown

UNITED STATES PATENT OFFICE.

OBADIAH HARNED, OF BROOKLYN, NEW YORK.

IMPROVEMENT IN VENTILATORS.

Specification forming part of Letters Patent No. 183,848, dated October 31, 1876; application filed April 1, 1876.

*To all whom it may concern:*

Be it known that I, OBADIAH HARNED, of Brooklyn, county of Kings, and State of New York, have invented a new and Improved Ventilator, of which the following is a specification:

This improved ventilator, though applicable to other purposes, is specially designed for use on railway-cars and other passenger-vehicles, proper ventilation in such vehicles being of the utmost importance to the health of those persons who are compelled to use them.

The object is to produce a ventilator of simple construction, which shall insure a pure and healthful atmosphere within a vehicle or apartment of a dwelling to which it may be applied, and yet will effectually exclude therefrom all back drafts, smoke, rain, hail, sleet, and snow. To this end the ventilator consists in the combination of a main shaft or series of shafts, adapted to communicate with a passenger-vehicle or apartment of a dwelling, a shaft arranged perpendicularly to such main shaft or shafts, and deflectors arranged at or near the outlets of said main shaft or shafts, whereby currents of air passing through the said perpendicular shaft will be diverted upward by the deflectors, and, passing over the outlets of the main shaft or shafts, will produce a partial vacuum above the same, and thus induce currents of air to ascend through the main shaft or shafts and escape, and insure a constant circulation of air through the said vehicle or apartment.

In the accompanying drawing, Figure 1 is a perspective view of a ventilator embodying my invention. Fig. 2 is a central longitudinal section thereof; and Fig. 3 is a central longitudinal section of a ventilator of the same kind, but slightly modified in form.

Similar letters of reference indicate corresponding parts in all the figures.

A designates the main shaft of the ventilator. It is represented as being vertical and square; but its shape is immaterial to the invention. B designates a shaft arranged perpendicularly to the main shaft, and with which the latter communicates at about the middle. This shaft B is represented as being nearly square, but has an arched top, so as to shed rain or anything else that may fall upon it; but I do not regard this shape as essential to the invention. C C are deflectors (see Figs. 2 and 3) extending from the outlet of the main shaft some distance into the perpendicular shaft, and entirely across the same in a lateral direction.

As just described, the ventilator is made for use on passenger-vehicles, and is to be arranged lengthwise of the vehicle, and in any suitable position for ventilating the same, or over a lamp-box. When the vehicle is in motion, currents of air passing through the perpendicular shaft B (see arrows in Figs. 2 and 3) come in contact with the nearest deflector C, are diverted upward, and, passing over the outlet of the main shaft A, produce a partial vacuum, and induce an upward current through the main shaft, which passes out into the external atmosphere. Thus a quantity of air is constantly being drawn out of the vehicle, and is replaced by fresh air entering through the crevices at the windows and doors or other openings. Any back current or draft which may enter the perpendicular shaft at the opposite end (see dotted arrows) strikes the other deflector C, is diverted upward, produces a partial vacuum over the outlet of the main shaft, induces an upward current through the same, and passes out of the farthest end of the perpendicular shaft. It will thus be seen that, no matter in which direction the wind may blow, none can possibly descend through the main shaft. Consequently no smoke, rain, hail, sleet, or snow can enter the vehicle, wherefore perfect ventilation of the latter is insured, and yet nothing can enter the vehicle through the ventilator. This ventilator is especially advantageous for steam railway-cars, because the smoke-cinders from the locomotive are effectually excluded.

Openings $a$ may be provided in the bottom of the perpendicular shaft B, to permit the escape of any liquid or solid matter which may enter it. If desirable, these openings may be fitted with slides or covers. The quantity of air withdrawn from the vehicle may be regulated by a register or valve capable of being operated within the vehicle.

Although I have represented the ventilator as arranged vertically, it may be arranged horizontally, or at any suitable angle, in which case the air will, by the deflectors, be diverted outward, instead of upward, but will nevertheless cause it to act upon the air in the main shaft in the same way.

In Fig. 3 I have represented three main shafts, A A¹ A², communicating with the same shaft B, and forming a single ventilator, which may be used instead of several smaller ones.

At the outlet of the shaft A are deflectors C, like those represented in Fig. 2; at the outlet of the shaft A¹ are deflectors C, of obtuse angular form; and at the outlet of the shaft A² are deflectors like those at the outlet of shaft A, but they are provided with covers or valves D, one of which is closed, and the other opened, by the currents of wind which pass through the perpendicular shaft B.

Though especially advantageous for passenger-vehicles, this ventilator may be applied to dwellings and other buildings; but when so applied it will preferably be swiveled and furnished with a vane, so that the perpendicular shaft will always be in the eye of the wind.

The superiority of this ventilator in preventing currents of air from descending into the vehicles or apartments with which its main shaft or shafts communicate is due to the arrangement of the perpendicular shaft, as well as to the deflectors. The openings $a$ serve to admit air from below, which, entering the main perpendicular shaft, induces the upward deflection of the air passing through such shaft. If desirable, deflectors E (see Fig. 3) may be used to deflect air upward through the openings $a$.

Where it is desirable to produce a very powerful draft, one of these ventilators may be used above and communicating with another advantageously.

What I claim as my invention, and desire to secure by Letters Patent, is—

1. The combination of a main shaft or series of shafts, a shaft arranged perpendicularly thereto, and deflectors extending into the latter from the wall or side which joins the main shaft or shafts, substantially as and for the purpose herein set forth.

2. The combination, with the main shaft or series of shafts, of a shaft arranged perpendicularly thereto, and provided with holes or openings $a$, and deflectors at or near the outlets of the main shaft or shafts, substantially as and for the purpose set forth.

O. HARNED.

Witnesses:
EDWIN H. BROWN,
THOMAS E. BIRCH.